United States Patent [19]

Maruyama et al.

[11] Patent Number: 5,675,588
[45] Date of Patent: Oct. 7, 1997

[54] TESTING APPARATUS FOR TRANSMISSION SYSTEM

[75] Inventors: Akira Maruyama, Kawasaki; Katsumi Yoshida, Oyama, both of Japan

[73] Assignee: Fujitsu Limited, Kanagawa, Japan

[21] Appl. No.: 529,905

[22] Filed: Sep. 18, 1995

Related U.S. Application Data

[63] Continuation of Ser. No. 216,140, Mar. 21, 1994, abandoned.

[30] Foreign Application Priority Data

Sep. 20, 1993 [JP] Japan .................. 5-233633

[51] Int. Cl.⁶ ............................................ G01R 31/28
[52] U.S. Cl. .................. 371/20.4; 371/27; 371/25.1;
  371/20.5; 364/222.2; 364/265.1; 324/73.1
[58] Field of Search .................... 371/20.4, 20.1,
  371/20.2, 27, 25.1, 49.1, 24, 20.5, 22.1,
  22.3, 22.6; 324/73.1, 158.1; 364/222.2,
  265.1

[56] References Cited

U.S. PATENT DOCUMENTS

| | | | |
|---|---|---|---|
| 3,866,217 | 2/1975 | Bennett, Jr. | 371/20.4 |
| 3,956,601 | 5/1976 | Harris et al. | 371/20.4 |
| 3,965,294 | 6/1976 | Renz et al. | 371/20.4 |
| 4,022,988 | 5/1977 | Lentz et al. | 371/20.4 |
| 4,158,193 | 6/1979 | D'Antonio | 371/27 |
| 4,271,514 | 6/1981 | Parras et al. | 371/15.1 |
| 4,428,076 | 1/1984 | Schuon | 371/5.1 |
| 4,672,307 | 6/1987 | Breuer et al. | 371/27 |
| 5,163,057 | 11/1992 | Grupp | 371/20.4 |
| 5,228,042 | 7/1993 | Gauthier et al. | 371/20.5 |
| 5,309,428 | 5/1994 | Copley et al. | 371/20.4 |

Primary Examiner—Robert W. Beausoliel, Jr.
Assistant Examiner—Dieu-Minh Le
Attorney, Agent, or Firm—Helfgott & Karas, P.C.

[57] ABSTRACT

A testing apparatus for a transmission system provided with a test pattern insertion unit for inputting a test pattern to the transmission system to be tested and a test pattern confirmation unit for inspecting signals passing through the transmission system and discriminating if the test pattern was normally received, the testing apparatus being provided with a non-test pattern followup unit for sending out to the transmission system, a non-test pattern different from the test pattern for a predetermined time following the end of the testing, whereby continued output of an alarm due to a false synchronized state occurring in the testing apparatus is prevented.

12 Claims, 8 Drawing Sheets

TESTING APPARATUS FOR TRANSMISSION SYSTEM

This is a continuation, of application Ser. No. 08/216,140, filed Mar. 21, 1994 now abandoned.

BACKGROUND OF THE INVENTION

1. Field of the Invention

The present invention relates to a testing apparatus for a transmission system.

A transmission system, for example, a transmission system which is comprised of an intra-office transmission apparatus which receives and processes signals (main transmission signals) transmitted through a high speed digital leased line and then retransmits the same, or has a plurality of such intra-office transmission apparatuses and connects the same by a high speed digital leased line, is tested within the intra-office transmission apparatus or tested over the plurality of intra-office transmission apparatuses.

The above tests are essential, for example, in the rehearsal confirmation at the time a network including the above transmission system is put into commercial service (so-called "service-in)". Also, the above tests are essential for trouble-shooting when a fault occurs in the network.

2. Description of the Related Art

As explained in more detail later referring to the drawings, when a testing apparatus of the conventional configuration was used, despite the issuance of a synchronization establishment signal SYC from a pseudo noise (PN) synchronization circuit, an alarm ALM sometimes continued to be output from a PN pattern matching circuit. The same situation would occur no matter how many retries were made. This problem arose even when it was confirmed by separate testing that the transmission system and the testing apparatus are completely normal. The cause was assumed to be the testing apparatus falsely synchronizing with a false test pattern.

SUMMARY OF THE INVENTION

Accordingly, the present invention has as its object to provide a transmission system which prevents the occurrence of a false synchronized state in the portion for confirming the test pattern and thereby does not generate false alarms.

To attain the above object, the present invention is provided with a test pattern insertion unit for inputting a test pattern into a transmission system to be tested, a test pattern confirmation unit for inspecting the signals passing through the transmission system and discriminating if the test pattern was normally received or not, and a non-test pattern followup unit for sending out a non-test pattern different from the test pattern for a predetermined time following the end of the testing. This thereby prevents the continued output of an alarm due to a false synchronized state in the testing apparatus.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be first described with reference to the accompanying drawings.

Figure 1:
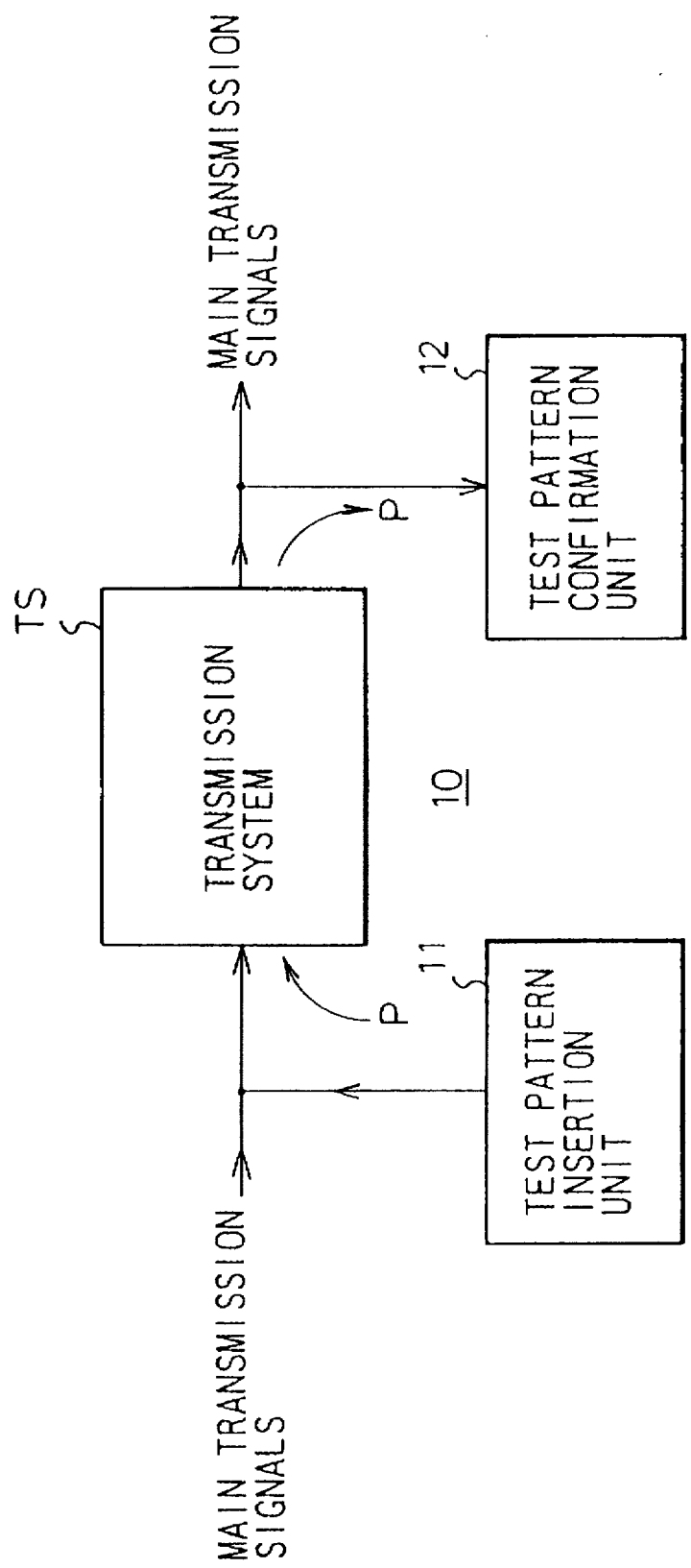
FIG. 1 is a view of the general configuration of a testing apparatus of a transmission system.

FIG. 1 is a view of the general configuration of a testing apparatus of a transmission system. In the figure, TS is the already mentioned transmission system to be tested. This transmission system TS normally receives, processes, and retransmits main transmission signals.

The testing apparatus 10 covered by the present invention, as illustrated, basically includes a test pattern insertion unit 11 for sending to the transmission system TS to be tested a test pattern P comprised of a repetition of a definite bit pattern and a test pattern confirmation unit 12 for inspecting the signals output through the transmission system TS and confirming if the test pattern P has been normally received or not.

Figure 2:
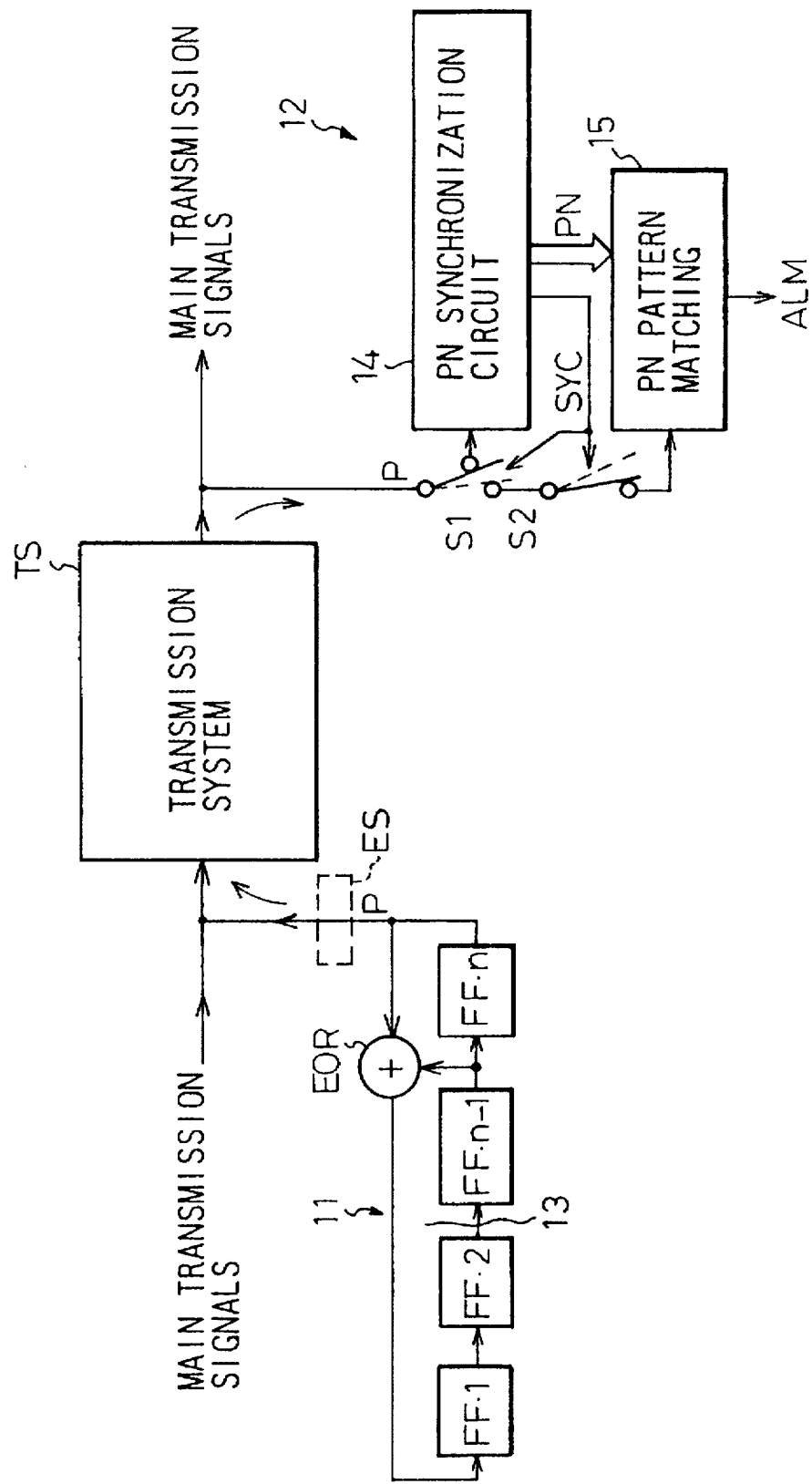
FIG. 2 is a more specific view of the configuration of FIG. 1.

More specifically, the test pattern insertion unit 11 and the test pattern confirmation unit 12 are constituted as follows:

FIG. 2 is a more specific view of the configuration of FIG. 1. In the figure, the test pattern insertion unit 11 is comprised of a PN pattern generator 13, which generates a so-called PN random pattern which becomes the above-mentioned test pattern P. The test pattern is fed into the transmission system TS. Note that the PN pattern generator 13 is generally comprised of n stages of flip-flops (FF1, FF2 . . . FFn) and EOR gates inserted in some of the same. In the figure, the case is shown where the generator polynomial is $X^n+X+1$.

On the other hand, the test pattern confirmation unit 12 receiving the test pattern is comprised of a PN synchronization circuit 14, a PN pattern matching circuit 15, and switches S1 and S2 attached to each of the same.

The PN synchronization circuit 14 receives as input a test pattern P comprised of a repetition of the same bit pattern sent from the test pattern insertion unit 11 through the switch S1 (one connected to solid line side). When it detects a bit pattern (PN random pattern) identical with the bit pattern of a known pattern P, it generates a synchronization establishment signal SYC, connects the switch S1 to the dotted line side, connects the switch S2 at the dotted line side to the solid line side, and judges by the PN pattern matching circuit 15 if the later repeatedly appearing bit pattern is correctly received. In this case, the PN pattern serving as the criteria for judgement at the PN pattern matching circuit 15 is one produced by the PN synchronization circuit 14 (containing therein a similar circuit as the PN pattern generator 13).

When a testing apparatus 10 of the above conventional configuration is used, as mentioned above, despite the issuance of a synchronization establishment signal SYC from the PN synchronization circuit 14, an alarm ALM continued to be output from the PN pattern matching circuit 15 and the same situation would occur no matter how many retries were made. This problem arises even if it is confirmed by separate testing that the transmission system TS and the testing apparatus 10 are completely normal. The cause was assumed to be the testing apparatus 10 falsely synchronizing with a false test pattern.

Figure 3:
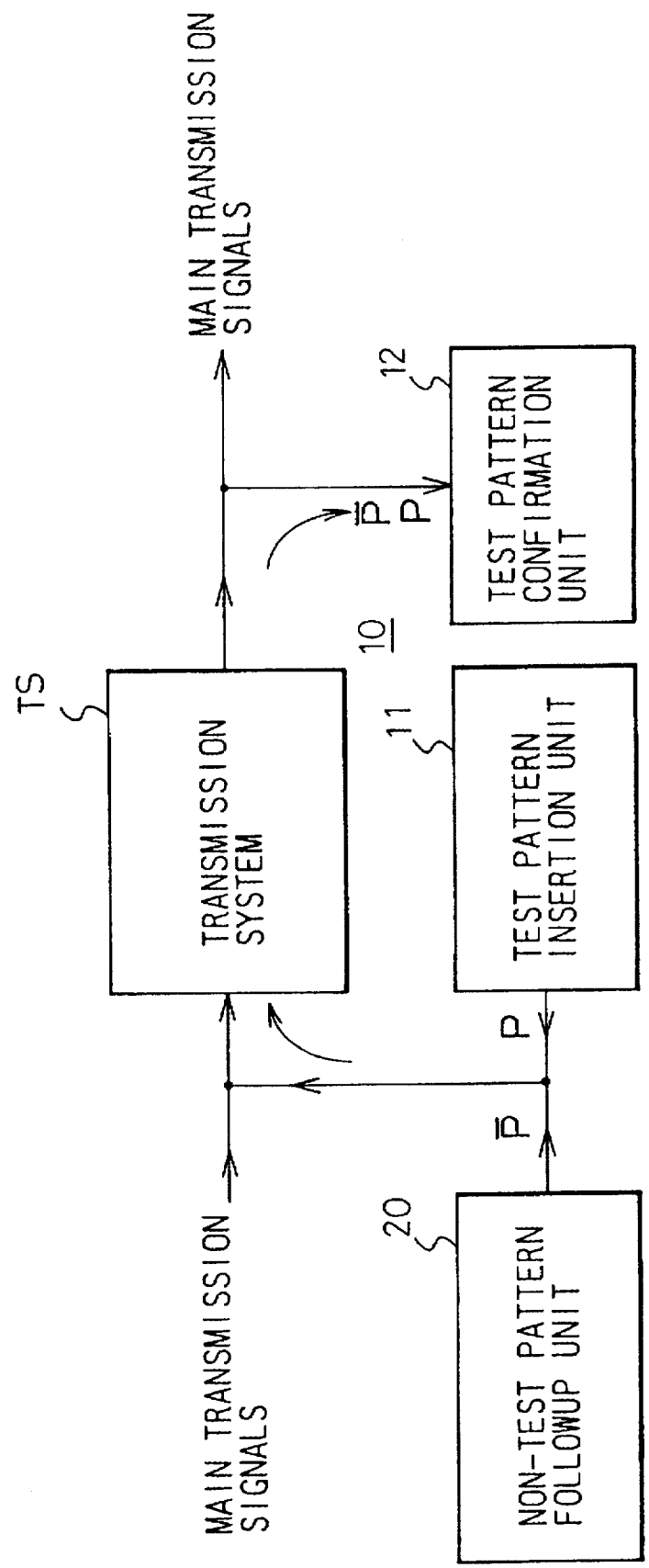
FIG. 3 is a view of the basic configuration of the present invention.

This problem is overcome by the present invention, which will be explained in detail below:

FIG. 3 is a view of the basic configuration of the present invention. Note that similar constituent elements are given the same reference numerals or symbols throughout the figures. Accordingly, comparing FIG. 1 and FIG. 2 with FIG. 3, the constituent element newly added by the present invention (FIG. 3) is the non-test pattern followup unit 20. The non-test pattern followup unit 20 sends out a non-test pattern (bar P) different from the test pattern instead of the test pattern P for a predetermined time after the test pattern finishes being sent from the test pattern insertion unit 11.

The synchronization protection bit length of the PN synchronization circuit 14 is about 2×n bits. Here, n is the number of stages (for example, n=15) of the flip-flops forming the PN pattern generator 13 of FIG. 2. Therefore, a when a PN pattern consisting of exactly 2n consecutive bits enters the PN synchronization circuit 14, synchronization is established (pulled in) at that time. The next arriving PN pattern (test pattern) is checked by the PN pattern matching circuit 15. In this case, the PN pattern (PN) produced by the PN synchronization circuit 14 itself and given to the circuit 15 and the PN pattern (test pattern P) received next by the circuit 15 through the switch S2 are completely matched in phase. In so far as the test pattern P does not contain any error, the alarm ALM should not be output from the circuit 15.

If the previously mentioned false synchronized state occurs, however, after the false synchronization is established, the PN pattern given from the circuit 14 to the circuit 15 and the PN pattern (test pattern P) next received by the circuit 15 through the switch S2 seldom match in phase. When the two phases are different, only naturally the alarm ALM is issued. The PN pattern from the circuit 14 to the circuit 15 and the PN pattern (P) received from the circuit 15 which differ in phase from each other continue to be off in phase after that and so the alarm ALM continues to be issued.

The causes for the occurrence of such a false synchronized state were examined and the following fact was found.

Referring to FIG. 3, there are various circuit elements on the path over which the test pattern P output from the test pattern insertion unit 11 travels as it moves through the transmission system TS to the test pattern confirmation unit 12. Among these circuit elements, it was found that the buffer memories are particularly relevant to the occurrence of this false synchronized state.

Buffer memories are provided in large numbers for various applications. One of these is the buffer memory for rate conversion. In the testing apparatus 10, in FIG. 2, there is an elastic storage shown by the dotted line block ES. Here, the test pattern P is buffered once so as to transfer a low speed test pattern (for example, 2 Mbps) to the speed of the previously mentioned high speed leased line (for example, 8 Mbps). In addition, there are believed to be several buffer memories for buffering the test pattern P on the path to the test pattern confirmation unit 12.

Assume now, however, that some sort of line fault has occurred, the testing apparatus 10 is activated to pinpoint the cause, the problem is eliminated, and the transmission system TS once again is placed into the normal service state. At this time, there is an extremely good chance that the test pattern P which had been used for the test remains as it is.

Assume also that another line fault occurs after this. As a result, the testing apparatus 10 is once again activated. At this time, the chances are very high that the first thing to enter into the test pattern confirmation unit 12 will not be the test pattern P from the test pattern insertion unit 11, but the test pattern (P') used for the previous test and remaining in the buffer memory.

If this is so, then the PN synchronization circuit (14 in FIG. 2) receiving the test pattern P' will mistake P' as the real test pattern P and output a synchronization establishment signal SYC. The PN pattern matching circuit (15 in FIG. 2) receives the PN pattern P' from the circuit 14 at this time and awaits the next test pattern P from the switch S2. The probability is extremely low, however, that the pattern P and the pattern P' will just happen to match in phase. In the end, the circuit 15 will judge that the two patterns do not match and will continue to output the alarm ALM.

Therefore, the present invention outputs a non-test pattern different from the test pattern for a predetermined time following the end of the test each time a test is performed so as to prevent the test pattern P used in the tests from remaining in the buffer memory.

Accordingly, the test pattern P' which remained in the related art is wiped clean from the buffer memory and the false synchronized state no longer occurs.

Figure 4:
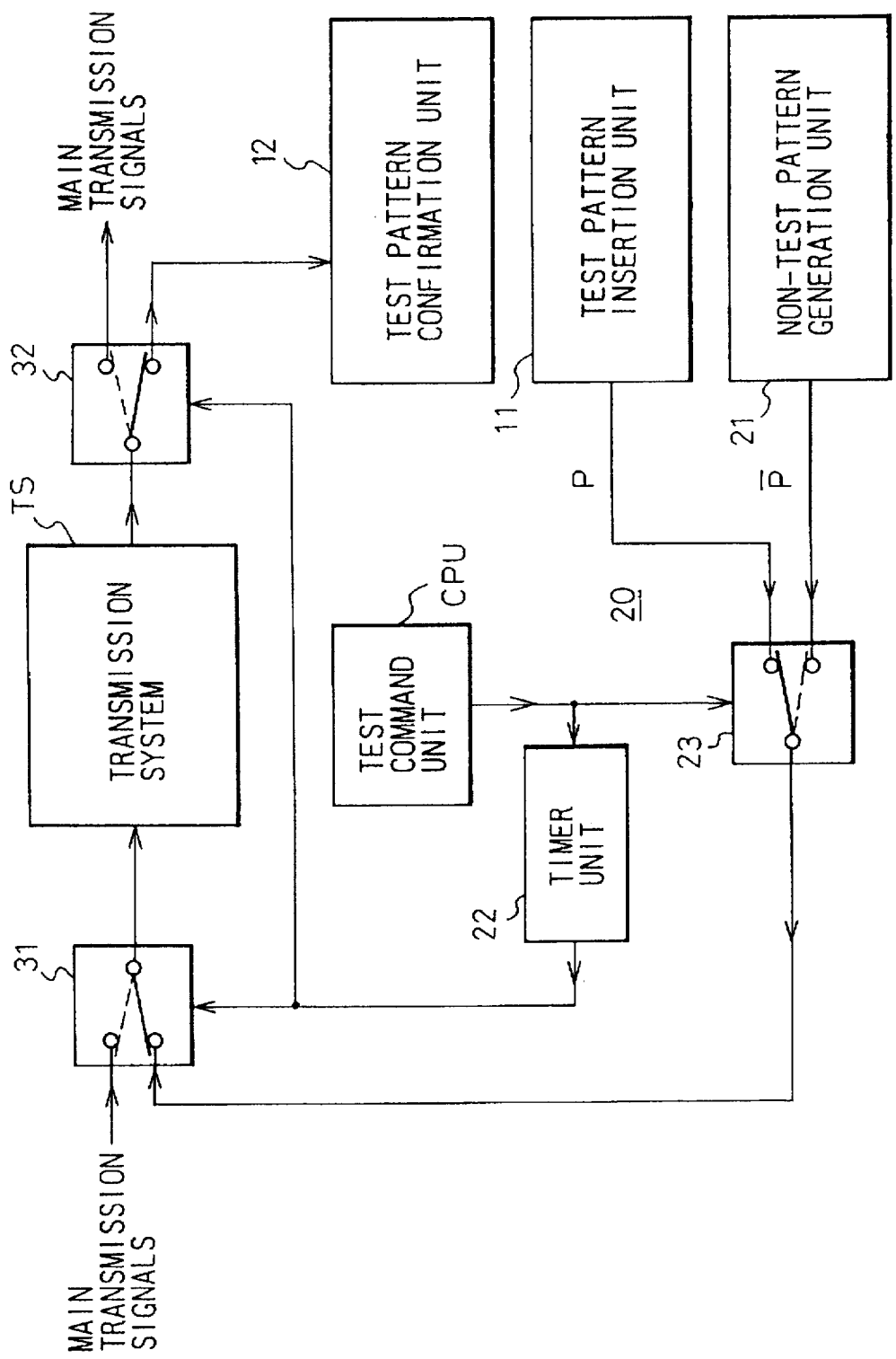
FIG. 4 is a view of an embodiment of the present invention.

FIG. 4 is a view of an embodiment of the present invention. First, looking at the non-test pattern followup unit 20, the unit is comprised of a non-test pattern generator 21 for outputting a non-test pattern (bar P) based on a test finish command ("L") from a test command unit CPU which instructs the start and end of testing by the testing apparatus 10 and a timer unit 22 for maintaining the issuance of the non-test pattern for the above-mentioned predetermined time.

That is, a pattern from the non-test pattern generator 21, which is different from the test pattern P, is continuously output instead of the test pattern P for a short time after the test command unit CPU has commanded the end of the testing.

As a result, the test pattern P is prevented from remaining in the buffer memory and therefore causing the false synchronized state.

The above-mentioned timer unit 22 controls the illustrated first selector 31 and controls the second selector 32. That is, the first selector 31 selectively inputs to the transmission system TS the test pattern P as well as the non-test pattern (bar P) in place of the main transmission signals during the test period from when the test start command ("H") has been output from the test command unit CPU to when a predetermined time has elapsed from when the test finish command ("L") has been generated. Further, the second selector 32 connects the output of the transmission system TS to the input side of the test pattern confirmation unit 12 instead of the input side of the main transmission signals.

In addition to the above first and second selectors 31 and 32, a third selector 23 is provided in the non-test pattern followup unit 20. This third selector 23 selectively switches between the output from the test pattern insertion unit 11 and the output from the non-test pattern generator 21 and applies the same to the first selector 31. That is, it selects the output of the test pattern insertion unit 11 side in response to a test start command ("H") from the test command unit CPU and selects the output of the non-test pattern generator 21 side in response to a test finish command ("L") from the test command unit CPU.

The output from the third selector 23 is transmitted to one input terminal of the first selector 31. In this case, the timer unit 22 continues to connect the first selector 31 to the third selector 23 side, that is, the input side of the test pattern as well as the non-test pattern, even after the test finish command ("L") has been output from the test command unit CPU. The timer unit 22 is comprised, for example, of a delay timer.

The non-test pattern generated from the non-test pattern generator 21 may be any pattern so long as it is not the same as the test pattern P, but most simply may be made an all "1" pattern or all "0" pattern.

The time during which this all "1" pattern or all "0" pattern is continuously output, that is, the delay time of the timer unit 22, is set to be substantially equal to or somewhat longer than the repeating cycle of the test pattern P, i.e., one cycle's worth of the bit pattern.

As already clarified in the explanation relating to FIG. 3, if there is even one cycle worth of the test pattern P remaining in the buffer memory, the PN synchronization circuit 14 will end up entering into the false synchronized state. Accordingly, the delay time of the timer 22 is made a time sufficient for overwriting a minimum of one cycle's worth of the bit pattern by an all "0" or all "1" pattern.

Figure 5:
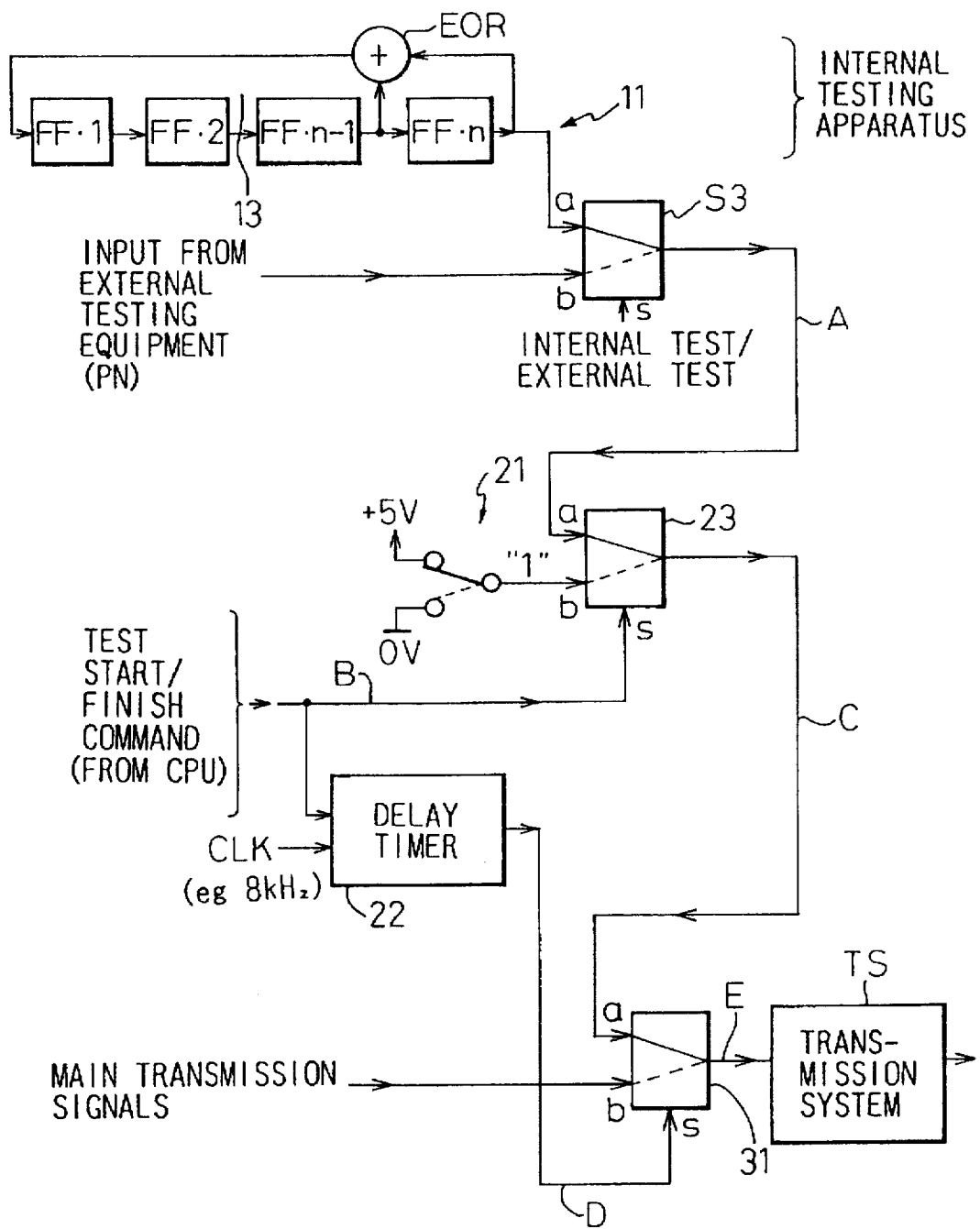
FIG. 5 is a view showing the pattern insertion side of the testing apparatus in more detail.

FIG. 5 is a more detailed view of the pattern insertion side of the testing apparatus. In the figure, the non-test pattern generator 21 is shown in particular detail and is merely a switch. If it is desired to use an all "1" pattern as the non-test pattern, it is sufficient to select the power voltage (+5 V), while if it is desired to use an all "0" pattern, it is sufficient to select the ground level (0 V).

The timer unit (delay timer) 22 shown is a timer which is incremented by an 8 kHz clock CLK, for example. Note that the switch S3 is not directly related to the present invention, but is for enabling testing by external test equipment.

Figure 6:
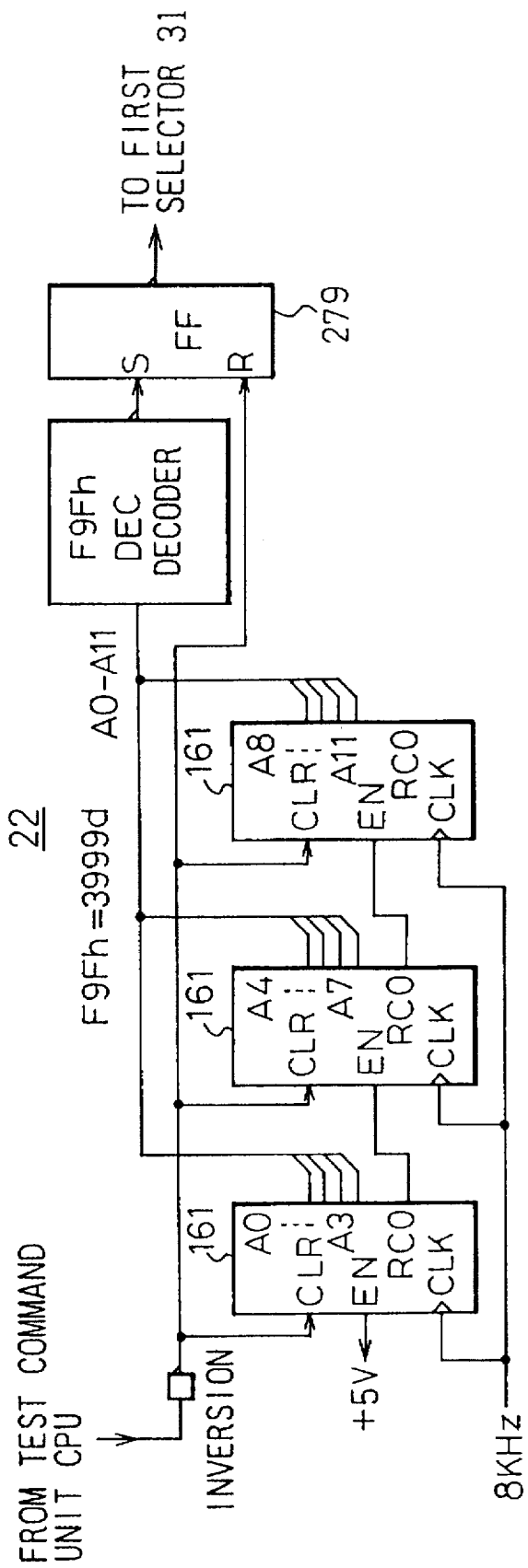
FIG. 6 is view of an example of an actual circuit of the timer unit 22.

FIG. 6 is a view of an example of the actual circuit of the timer unit 22. In the figure, the IC circuit 161 used may be a 161 series 16-sequence counter (ALS161, HC161, etc.) and the IC circuit 279 used may be a 279 series latch (ALS279, HC279, etc.) If the delay time (timer time) is made 0.5 second, since the clock is 8 kHz, the decoder decodes the hexadecimal F9Fh.

FIGS. 7A to 7E are view of waveforms of major signals in FIG. 5. In the figures, the waveforms of FIG. 7A to 7E are for the signals appearing at the major portions A to E in FIG. 5.

Figure 7:
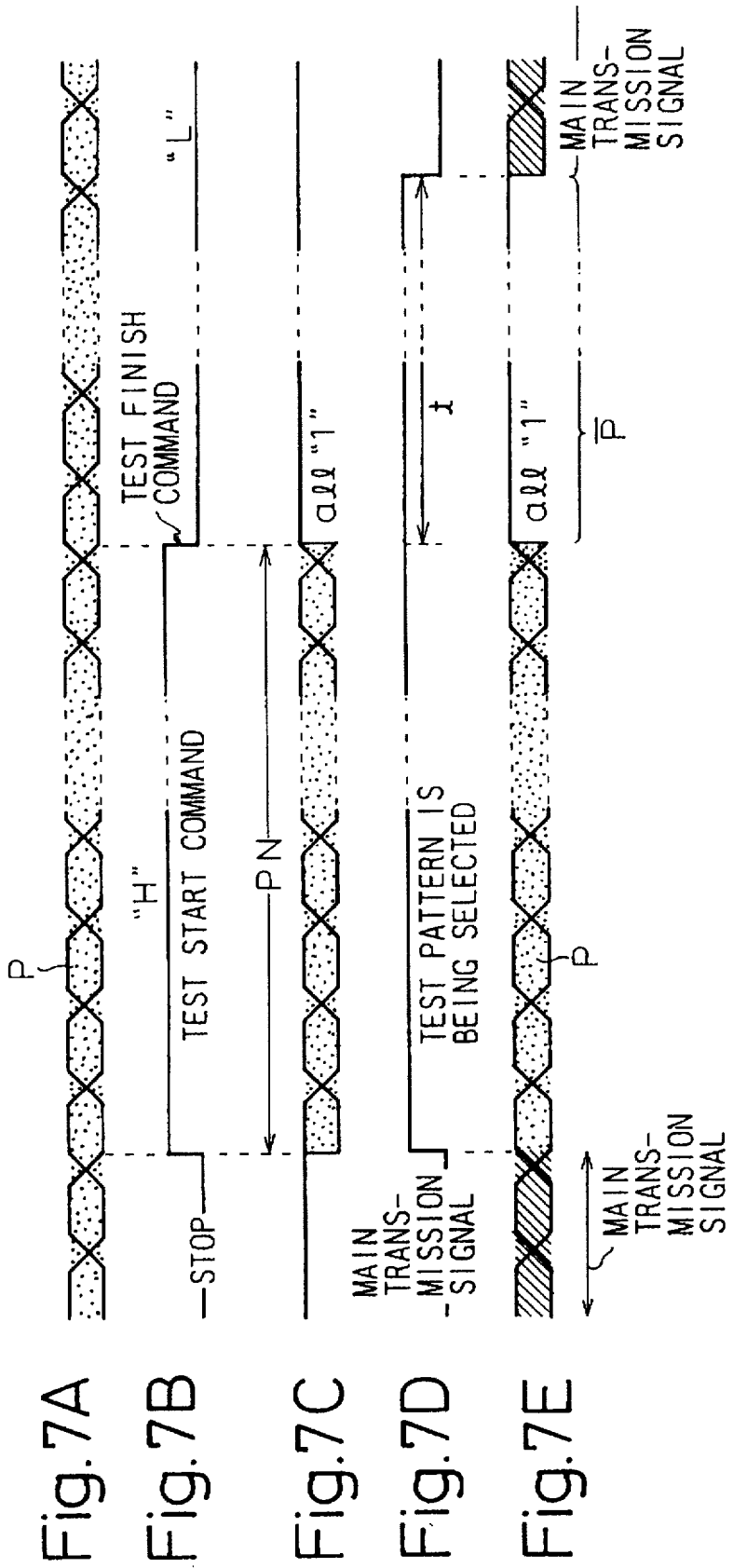
FIGS. 7A, 7B, 7C, 7D, and 7E are views of waveforms of major signals in FIG. 5.

When a test start command is issued ("H" in FIG. 7B), the test pattern P (PN pattern) shown in FIG. 7A is output as shown in FIG. 7C from the third selector 23. The first selector 31 receiving this selects and outputs the test pattern P by the output from the timer unit 22 shown in FIG. 7D.

The feature of the present invention becomes more apparent after the issuance of the test finish command ("L") shown in FIG. 7B. That is, when this finish command is issued, the timer unit 22 continues to output "H" for the delay time (see t in FIG. 7D) and holds the state of the first selector 31 as it is.

On the other hand, the third selector 23 is immediately switched to by this finish command and a non-test pattern (all "1" in the example shown) is output as shown in FIG. 7C. This all "1" pattern is output from the first selector 31 as shown by FIG. 7E for the delay time t. The time shown by bar P in FIG. 7E is the time for clearing the above-mentioned buffer memory, that is, the time for overwriting the residual test pattern P with all "1".

Figure 8:
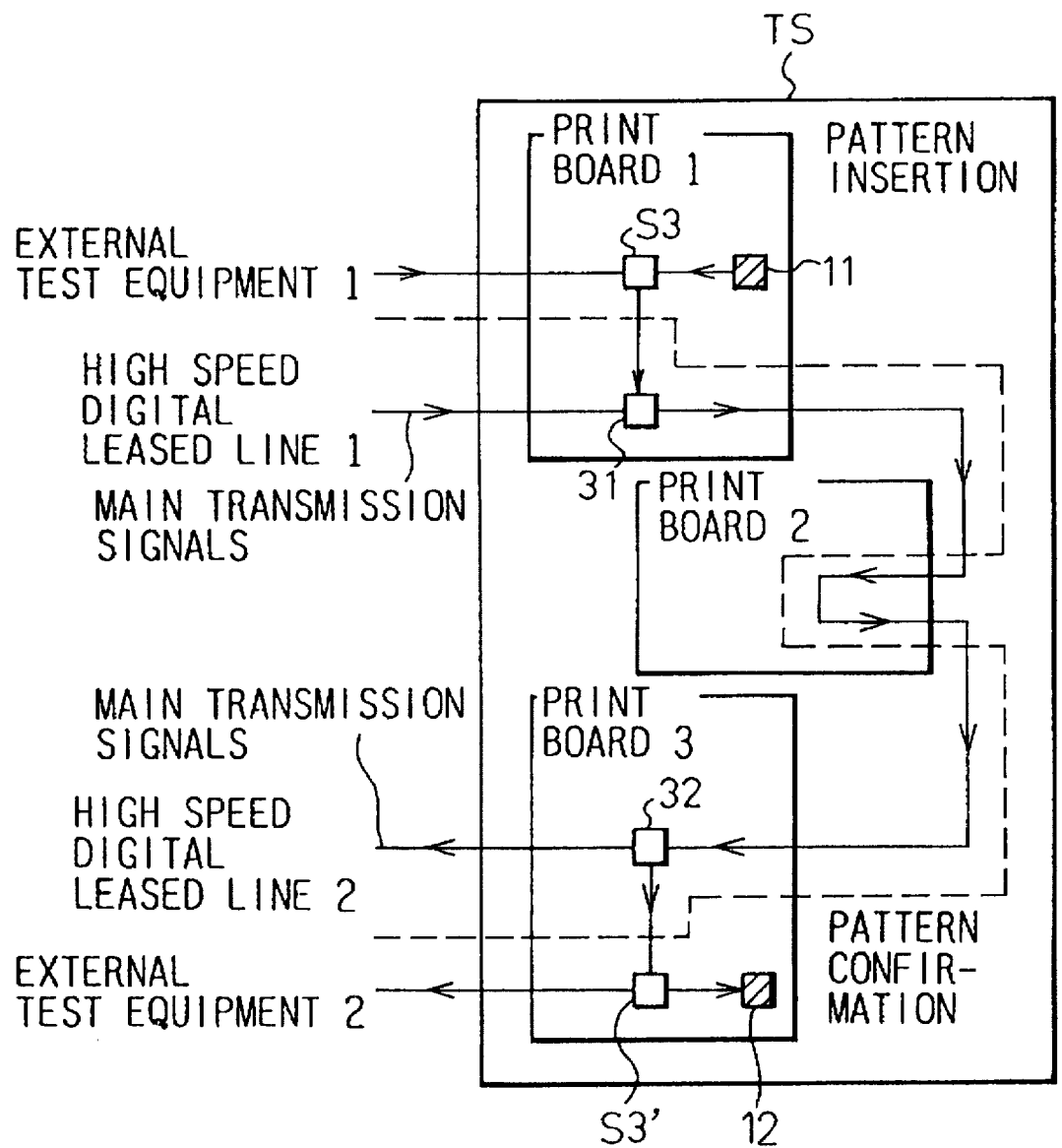
FIG. 8 is a view of an example of the configuration of a system to which the present invention is applied.

FIG. 8 is a view of an example of the configuration of a system to which the present invention is applied. According to this system configuration, the testing apparatus 10 of the present invention is completely housed in the transmission system TS being tested.

In the figure, S3 (shown also in FIG. 5) and S3' are switches for changing over between external testing and internal testing (testing according to the present invention). Enabling testing from both the inside and outside is a recent trend. The units relating to the internal testing are the test pattern insertion unit 11 and the test pattern confirmation unit 12. The path relating to the testing is shown by the dotted line in the figure. The dotted line path is formed selectively by the first selector 31 and second selector 32.

More specifically, the printed circuit boards 1 and 3 in the figure are a transmission line interface board and a test pattern interface board, while the printed circuit board 2 is an internal processing circuit board of the transmission system.

As explained above, the present invention elucidates the cause of the problem of the related art of the test pattern confirmation unit 12 entering a false synchronized state and the alarm ALM continuing to be output as a result and realizes hardware able to fundamentally eliminate the problem.

We claim:

1. A testing apparatus for a transmission system comprising:

a test pattern insertion unit, connected to an input of a transmission system to be tested, for transmitting test signals in a test pattern having a repeating cycle to the transmission system;

a test pattern confirmation unit, connected to an output of the transmission system, for inspecting said test signals passing through the transmission system and discriminating whether or not the test pattern was normally received; and a non-test pattern followup unit, connected to the input of the transmission system, for sending to said transmission system a non-test pattern that is different from the test pattern for a predetermined time following an end of issuance of the test pattern from the test pattern insertion unit, said predetermined time being approximately equal to a cycle of said repeating test cycle, said transmission system being substantially cleared of said test pattern by sending said non-test pattern for said predetermined time, wherein said non-test pattern follow-up unit comprises a test command unit, a non-test pattern generator for outputting said non-test pattern on the basis of a test finish command from said test command unit commanding the start and end of testing by said testing apparatus, and a timer unit coupled to said test command unit for controlling the transmission of said non-test pattern for said predetermined time;

said testing apparatus further comprising:

a first selector, coupled to said transmission system, for selecting inputting to said transmission system said test pattern and said non-test pattern in place of main transmission signals during a test period from when a test start command is output from said test command unit to when said predetermined time has elapsed from the output of said test finish command, and a second selector for connecting an output of the transmission system to an input of said test pattern confirmation unit instead of an input side of said main transmission signals to be output from said transmission system during said test period, said non-test pattern follow-up unit including a third selector for selectively switching between an output from the test pattern insertion unit and an output from said non-test pattern generator and applying the output from said non-test pattern generator to the first selector, and said third selector selects one of the output of said test pattern insertion unit in response to said test start command from said test command unit and the output of the non-test pattern generator in response to said test finish signal from said test command unit.

2. A testing apparatus as set forth in claim 1, wherein said timer unit includes a delay timer connected between the first selector and the third selector to enable the input of the test pattern and the non-test pattern even after the test finish command has been output from said test command unit.

3. A testing apparatus as set forth in claim 1, wherein said non-test pattern from said non-test pattern generator is an all "1" pattern or an all "0" pattern.

4. A testing apparatus as set forth in claim 1, wherein a delay time of said timer unit is set equal to or somewhat longer than the repeating cycle of said test pattern, that is, the time of one cycle of said test pattern.

5. A testing apparatus as set forth in claim 3, wherein said non-test pattern generator is a switch which is operative to select a power source voltage when using an all "1" pattern as the non-test pattern and to select a ground level when using an all "0" pattern.

6. A testing apparatus as set forth in claim 1, further comprising a switch for changing over between internal testing carried out by said test pattern insertion unit and said test pattern confirmation unit and external testing carried out by an external testing apparatus.

7. A testing apparatus for a transmission system comprising:

a test pattern insertion unit, connected to an input of a transmission system to be tested, for transmitting test signals in a test pattern having a repeating cycle to the transmission system;

a test pattern confirmation unit, connected to an output of the transmission system, for inspecting said test signals passing through the transmission system and discriminating whether or not the test pattern was normally received; and a non-test pattern followup unit, connected to the input of the transmission system, for sending to said transmission system a non-test pattern that is different from the test pattern for a predetermined time following an end of issuance of the test pattern from the test pattern insertion unit, said predetermined time being not less than a cycle of said repeating test cycle, said transmission system being substantially cleared of said test pattern by sending said non-test pattern for said predetermined time, wherein said non-test pattern follow-up unit comprises a test command unit, a non-test pattern generator for outputting said non-test pattern on the basis of a test finish command from said test command unit commanding the start and end of testing by said testing apparatus, and a timer unit coupled to said test command unit for controlling the transmission of said non-test pattern for said predetermined time;

said testing apparatus further comprising:

a first selector, coupled to said transmission system, for selecting inputting to said transmission system said test pattern and said non-test pattern in place of main transmission signals during a test period from when a test start command is output from said test command unit to when said predetermined time has elapsed from the output of said test finish command, and a second selector for connecting an output of the transmission system to an input of said test pattern confirmation unit instead of an input side of missing line transmission system during said test period, said non-test pattern follow-up unit including a third selector for selectively switching between an output from the test pattern insertion unit and an output from said non-test pattern generator and applying the output from said non-test pattern generator to the first selector, and said third selector selects one of the output of said test pattern insertion unit in response to said test start command from said test command unit and the output of the non-test pattern generator in response to said test finish signal from said test command unit.

8. A testing apparatus as set forth in claim 7, wherein said timer unit includes a delay timer connected between the first selector and the third selector to enable the input of the test pattern and the non-test pattern even after the test finish command has been output from said test command unit.

9. A testing apparatus as set forth in claim 7, wherein said non-test pattern from said non-test pattern generator is an all "1" pattern or an all "0" pattern.

10. A testing apparatus as set forth in claim 7, wherein a delay time of said timer unit is set equal to or somewhat longer than the repeating cycle of said test pattern, that is, the time of one cycle of said test pattern.

11. A testing apparatus as set forth in claim 9, wherein said non-test pattern generator is a switch which is operative to select a power voltage when using an all "1" pattern as the non-test pattern and to select a ground level when using an all "0" pattern.

12. A testing apparatus as set forth in claim 7, further comprising a switch for changing over between internal testing carried out by said test pattern insertion unit and said test pattern confirmation unit and external testing carried out by an external testing apparatus.

* * * * *